United States Patent [19]

Tombers et al.

[11] Patent Number: 5,398,791
[45] Date of Patent: Mar. 21, 1995

[54] METHOD FOR CROWN PLATING A CAMPLATE AND A METAL-PLATED CAMPLATE FORMED THEREBY

[75] Inventors: Michael D. Tombers, Lockport; James W. Heilenbach, Riverside; Justin E. Wagner, Joliet, all of Ill.

[73] Assignee: General Motors Corporation, Detroit, Mich.

[21] Appl. No.: 209,343

[22] Filed: Mar. 14, 1994

[51] Int. Cl.$^6$ .......................... C25D 5/02; C25D 5/16
[52] U.S. Cl. .............................. 192/45; 192/107 M; 205/95; 205/122
[58] Field of Search ............... 192/45, 107 M; 205/95, 205/122

[56] References Cited

U.S. PATENT DOCUMENTS 3,730,316  5/1973  Zimmer .................. 192/41 A
4,878,570 11/1989  Zlotek ...................... 192/45

OTHER PUBLICATIONS

A. Kenneth Graham, editor, *Electroplating Engineering Handbook*, second edition, Reinhold Publishing Corp., New York, 1962, pp. 480–490, 550–559.

*Primary Examiner*—John Niebling
*Assistant Examiner*—William T. Leader
*Attorney, Agent, or Firm*—Patrick M. Griffin

[57] ABSTRACT

A method is provided for improving the load distribution on a ramp-surface of a clutch mechanism, such as the camplate of an overrunning clutch for the turbocharger of a locomotive diesel engine. In addition, an improved camplate produced by such a method is also provided in accordance with this invention. The method involves an electroplating process in which the electrostatic field is uniquely shaped so as to concentrate the electrostatic flux at a central region of the ramp surface, such that a greater amount of plating metal is deposited in the central region of the ramp surface as compared to the edges of the ramp surface. As a result, the ramp surface has a crowned contour as defined by the plating alone, and does not require a pre- or post-plating crown grind operation. The crowned contour serves to advantageously distribute a load over the ramp surface, so as to promote a longer service life for the camplate.

20 Claims, 2 Drawing Sheets

METHOD FOR CROWN PLATING A CAMPLATE AND A METAL-PLATED CAMPLATE FORMED THEREBY

The present invention generally relates to methods for reducing wear of load-transmitting mechanisms, such as clutches. More particularly, this invention relates to an electroplating process which selectively plates a load bearing surface of such a load-transmitting mechanism, wherein the plating produced thereby is deposited on the load bearing surface so as to more evenly distribute the contact stresses on the surface, such that a longer service life for the mechanism is achieved.

BACKGROUND OF THE INVENTION

Clutches and similar types of load-transmitting mechanisms are highly susceptible to wear during the transition period when the clutch is engaging and disengaging, in which the input and output members are being coupled or uncoupled. While friction clutches are generally provided with a sacrificial wear surface which can be replaced as required, positive-type clutches are designed to transmit torque without allowing for any significant degree of slippage between the engaging members. A variation of the positive-type clutch is an overrunning clutch, which positively engages the input and output members, yet allows the output member to rotate relative to the input member when the output member is urged to rotate faster than the input member. Due to its mode of operation, an overrunning clutch must be capable of repeatedly withstanding loading with minimal wear and damage to its load bearing surfaces.

An example of an application for an overrunning clutch is in turbochargers employed with two-stroke diesel engines used for locomotives. At lower engine speeds and loads, the turbocharger must be mechanically driven in that the exhaust gases do not contain enough energy to drive the turbocharger. However, sufficient energy is present in the exhaust gases at higher engine speeds and loads for driving the turbocharger, necessitating the use of an overrunning clutch to disengage the turbocharger from the gear train in order to allow the turbocharger to respond to the input provided by the exhaust gases. Clutches designed for this application generally include an annular-shaped camplate at whose outer periphery are formed a number of slots. The base of each slot defines a ramp which is in rolling contact with a cylindrical roller, such that the ramps serve as a load bearing surfaces for the camplate. The clutch must be capable of withstanding high bearing loads while continuously and reliably operating for extremely long periods of time, in that locomotive diesel engines are often in operation in excess of 90 percent of their lifetime.

As one would expect, the wear characteristics of the rollers and the ramps on the camplate largely determine the service life of the clutch. The rollers are preferably formed from a hard material, such as SAE 4620 or 8620H, and are carburized to a depth sufficient to provide a durable wear surface. The camplate is also preferably formed from a hard material, such as SAE 8620H, and carburized to a depth which is sufficient to achieve a surface hardness which is compatible with that of the rollers. Even so, the ramps of the camplate tend to deform slightly under the load of their rollers during operation. Significantly, the edges of the ramps inherently suffer higher contact stresses due to greater deformation at the ends of the rollers under normal loading conditions. Contact stresses are even higher when misalignment exists between the rollers and the ramps, such as when the rolling axis of a roller is not parallel with the axis of the camplate. Consequently, greater wear typically occurs at the edges of the camplate ramps.

It is generally known to deposit functional chromium, or hard chrome, plating on the load bearing surfaces of gears, bearings, and camming mechanisms in order to produce very hard, gall and wear resistant surfaces. However, electroplating processes naturally tend to produce metal buildup along edges due to concentration of the electrostatic flux. Unless removed, this buildup promotes cracking and chipping of the chromium plating, which leads to premature failure of the plated surface as well as the member bearing against the plated surface. To eliminate the plating buildup, a postplating grinding operation is necessary. However, grinding the chromium plating carries a significant cost penalty in terms of processing time and tooling. As a result, profile grinding of a plated surface is not typically done. Though it is known to profile grind carburized surfaces, such an approach has typically been adopted only where there is a significant concern for contact stresses, such as with gears and bearings.

When the mating member is a bearing, an alternative to profiling the plated load bearing surface is to form the bearing as a cylindrical roller having a larger diameter midsection and smaller diameter ends. With this approach, the distribution of contact stresses over the plated surface is more uniform than if a standard roller bearing is used. However, the cost to manufacture cylindrical rollers having sufficient taper to adequately distribute the contact stresses on the ramp surface of a camplate is also quite high.

An alternative to the approaches mentioned above is to alter the profile of the load bearing surface by profile grinding the edges of the bearing surface prior to plating. A layer of chromium is then deposited on the load bearing surface so as to generally generate a crowned profile on the surface, which promotes a more uniform distribution of contact stresses across the load bearing surfaces. Again, however, the significant costs associated with the grinding operation are a disadvantage to adopting this approach.

While the above profile grinding operations have generally been utilized by gear and bearing manufacturers, the processing and cost disadvantages associated with electroplating and profile grinding have tended to discourage those in the railway industry from chromium plating the ramps of clutch camplates for turbochargers of locomotive engines. Though improvements in camplate service life are obviously desirable, economic efficiencies dictate that a method employed to improve clutch life must be evaluated with consideration for the costs involved in implementing the method. Generally, in applications where chromium plating of the camplate ramps is warranted, the additional expense of a profile grinding operation may not be cost effective.

From the above, it can be seen that what is needed is a cost-effective method by which the service life of a clutch could be improved, wherein the method is particularly adapted to improving the wear characteristics of the load bearing surfaces of a clutch used to engage and disengage the turbocharger of a locomotive diesel engine.

SUMMARY OF THE INVENTION

It is an object of this invention to provide an electroplating process which selectively plates a load bearing surface of a clutch mechanism so as to enable the plating to more evenly distribute the contact stresses imposed on the load bearing surface, and thereby promote a longer service life for the clutch mechanism.

It is a further object of this invention that such a process produce a crown on the load bearing surface, so as to reduce the contact stresses along the edges of the load bearing surface.

It is another object of this invention that such a process uniquely shape the electrostatic field during the electroplating process so as to concentrate the electrostatic flux on the load bearing surface to be plated, so as to produce the desired crown during the electroplating process.

In accordance with a preferred embodiment of this invention, these and other objects and advantages are accomplished as follows.

According to the present invention, there is provided a method for improving the contact stress distribution on a load bearing surface of a clutch mechanism, such as the camplate of an overrunning clutch for the turbocharger of a locomotive diesel engine. In addition, an improved camplate produced by such a method is also provided in accordance with this invention. The method involves an electroplating process in which the electrostatic field is uniquely shaped so as to concentrate the electrostatic flux at a central region of the load bearing surface, such that a greater amount of plating metal is deposited in the central region of the load bearing surface as compared to the edges of the load bearing surface. As a result, the load bearing surface has a crowned contour as defined by the plating process alone, and does not require a pre- or post-plating crown grind operation. The crowned contour serves to distribute the bearing load over the load bearing surface in a manner that promotes a longer service life for the camplate.

The electroplating method of this invention generally includes circumscribing the clutch camplate with a mask. The mask is positioned with respect to the outer perimeter of the camplate so as to substantially mask the edge regions of the load bearing surface formed on the perimeter of the camplate, such that the mask defines an annular-shaped opening which is aligned with an intermediate region of the load bearing surface, i.e., the region intermediate the edge regions on the load bearing surface. Together, the intermediate region and the edge regions define the axial width of the load bearing surface of the camplate.

An electrode is then positioned adjacent the opening in the mask such that the mask concentrates the electrostatic flux at the intermediate region of the load bearing surface. Once the members are appropriately fixtured in accordance with the above, they are immersed in an electroplating bath and the camplate is electroplated, such that a greater thickness of metal is deposited on the intermediate region of the load bearing surface than the edge regions of the load bearing surface. The result is a crowned profile formed on the load bearing surface, eliminating the need for a crown grinding operation.

With the resulting crowned plating, any contact stresses imposed on the load bearing surface by a roller bearing disposed widthwise across the load bearing surface will be more uniformly distributed. In particular, the crowned plating made possible by this invention significantly reduces the contact stresses at the ends of a roller bearing in rolling contact with the load bearing surface under normal loading conditions, as well as under conditions when the roller bearing is misaligned with the load bearing surface. The crown plating method of this invention achieves this desirable result without requiring a pre- or post-plating grinding operation to define the profile on the load bearing surface. In addition, the crown plating method substantially eliminates a buildup of plated metal along the edges of the load bearing surfaces, such that cracking and chipping of the metal plating is significantly reduced.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

An electroplating method is provided for improving the wear characteristics of the load bearing surfaces of a camplate used in an overrunning clutch. The method of this invention is particularly adapted to improve the service life of such a camplate when used in turbochargers employed with two-stroke diesel engines used for locomotives. However, overrunning clutches capable of benefiting from the improvements of this invention have numerous other applications, including automotive starter motors and transmissions, and helicopter drives.

Figure 1:
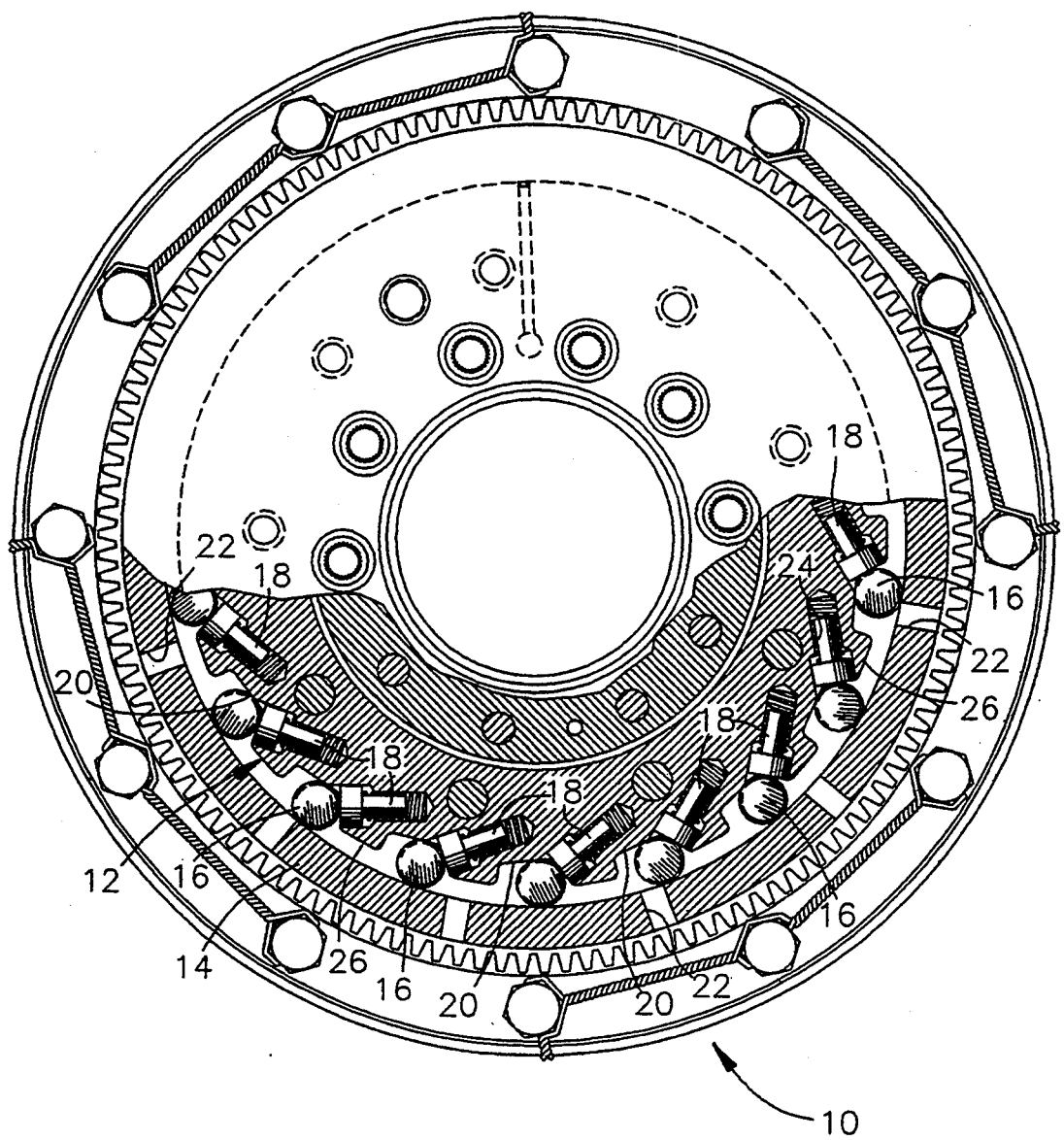
Fig. 1 shows in partial cross-section an overrunning clutch for a turbocharger of a two-stroke locomotive diesel engine.

An illustrative example of the type of overrunning clutch used in locomotive applications is shown in FIG. 1. Generally, the clutch 10 includes an annular-shaped camplate 12 which is engagable with a driven member 14 through a number of roller bearings 16. Typically, the camplate 12 and the driven member 14 are formed from SAE 8620H, and the roller bearings 16 are formed from SAE 4620 or 8620H. Preferably, the camplate 12 and driven member 14 are carburized to a depth of about 1.3 to about 1.8 millimeters to achieve a surface hardness of at least about 62 on the Rockwell C scale, while the roller bearings 16 are carburized to a depth of about 1.3 millimeters to achieve a surface hardness of about 60 to about 64 on the Rockwell C scale. While the above materials are preferred, alternate materials may be used as required by the demands of a particular application.

As shown, the camplate 12 has protrusions or teeth 26 formed at its perimeter so as to define therebetween a like number of load bearing surfaces, or ramps 20, each of which is in rolling contact with one of the roller bearings 16. The ramps 20 are each tapered radially outwardly toward their clockwise end, as viewed in FIG. 1. Each of the roller bearings 16 is urged up its corresponding ramp 16 by a spring member 18 which is received in a bore 24 formed in the camplate 12. As a result, the driven member 14 is free to overrun when rotating in a counter-clockwise direction relative to the camplate 12, when viewed as shown in FIG. 1. Holes 22 are provided in the driven member 14 to allow oil to drain from the space between the camplate 12 and the driven member 14.

Figure 2:
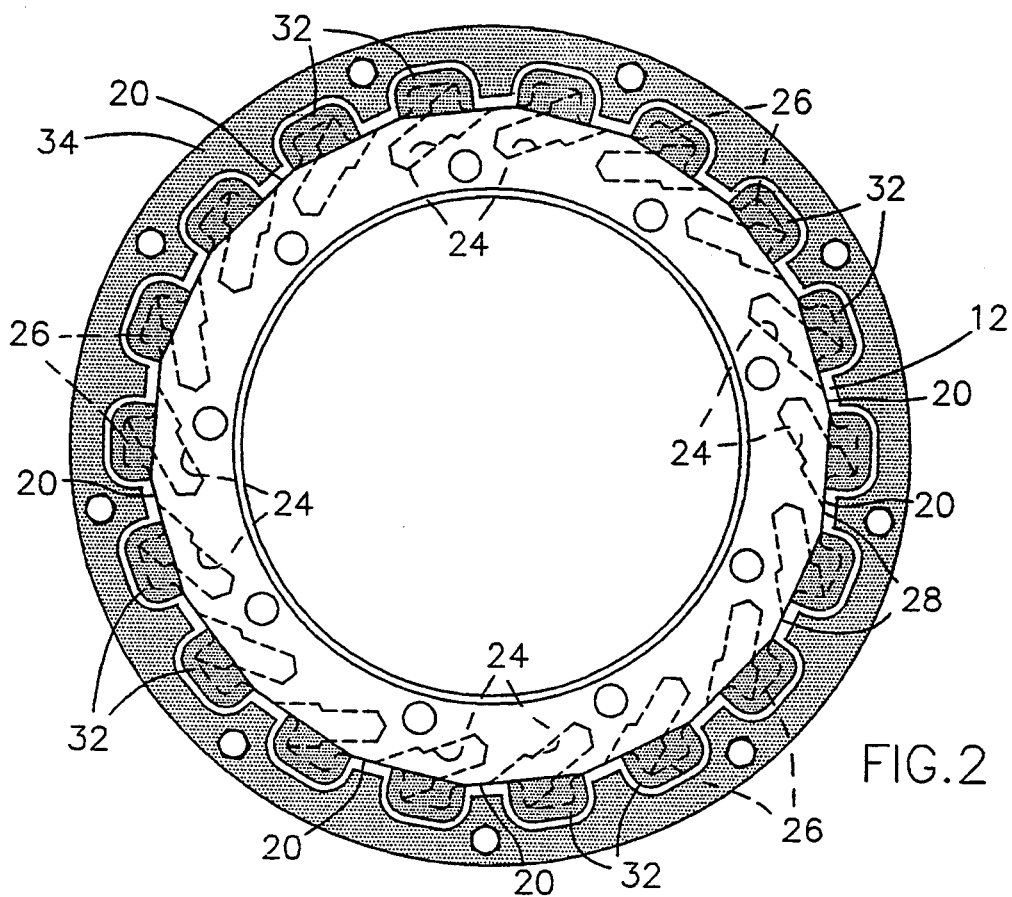
FIG. 2 shows the camplate of the overrunning clutch of FIG. 1, including a mask circumscribing the camplate in accordance with this invention.

Referring now to FIG. 2, the camplate 12 is shown in more detail and as it would be seen when prepared for the electroplating process of this invention. As shown, the camplate 12 is circumscribed with a mask 34 whose inner profile closely corresponds to that of the outer perimeter of the camplate 12. The radial spacing between the mask 34 and the perimeter of the camplate 12 is preferably about 3 to about 6 millimeters. The mask 34 is composed of two annular-shaped members, as can be seen with reference to FIG. 4. The axial spacing between each of the members of the mask 34 is preferably no greater than about 70 percent of the axial width of the ramps 20. The mask 34 can be formed from any suitable material which is nonconductive so as preclude its being plated during the electroplating process. In practice, polyvinyl chloride has been found to be a suitable material for this purpose, though numerous other materials could foreseeably also be used.

Also shown in FIG. 2 are caps 32 which serve as masks over the teeth 26 of the camplate 12. Because the teeth 26 do not serve as load bearing surfaces for the clutch 10, it is not necessary or generally desirable to plate the surfaces of the teeth 26. Each of the caps 32 can be readily sized to closely mate with one of the teeth 26 so as to completely mask the surfaces of the teeth 26 during plating. In addition, it is preferable that the caps 32 mask the region between the teeth 26 and the ramps 20 defined by a radius, as shown in FIG. 2, in that this region is a high stress area of the camplate 12. A suitable material for the caps 32 is a plastisol, although other materials could be used.

Figure 3:
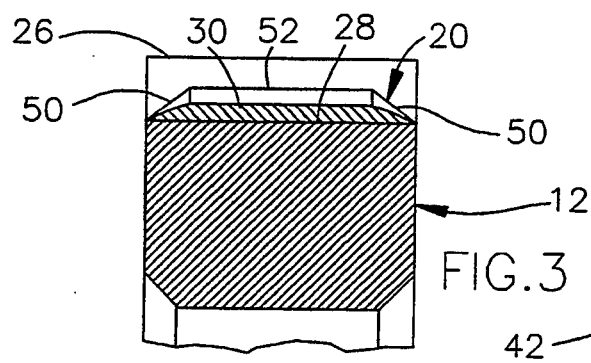
FIG. 3 shows in cross-section a preferred crowned profile formed on the load bearing surface of the camplate of FIG. 2.

The ramps 20 shown in FIG. 1 are represented in FIG. 2 by an unplated ramp profile 28, so as to distinguish their pre- and post-plating configurations and profiles, as shown in greater detail in FIG. 3. In particular, the ramp profile 28 illustrated in FIG. 2 is sloped radially outward toward its clockwise end, but is otherwise flat, with no crown profile provided across its axial width, i.e., in a direction parallel to the axis of rotation of the camplate 12. In contrast, FIG. 3 illustrates the post-plating profile of one of the ramps 20. As shown, a layer of metal 30, such as chromium, is deposited on the ramp profile 28 to produce the ramp 20 and the crowned profile desired for the ramp 20. In a preferred embodiment of this invention, three surface regions are defined on the ramp 20, two of which are edge regions 50 which are located along the axial edges of the ramp 20, while the region of the ramp 20 between the edge regions 50 is designated an intermediate region 52. The intermediate region 52 preferably constitutes about 50 to about 70 percent of the axial width of the ramp 20, with each of the edge regions 50 constituting about 20 percent of the ramp 20, however, these may vary depending on the size of the load bearing surfaces for a particular application. It is within the intermediate region 52 that the maximum thickness of the metal layer 30 is desired for the purpose of concentrating the bearing load at the center of the ramp 20. In practice, chromium deposited to a thickness of about 0.005 to about 0.009 millimeters, has been found to provide a suitable wear resistant load bearing surface for the camplate 12. In contrast, the metal layer 30 deposited within the edge regions 50 is gradually tapered, such that little metal is deposited at the extreme edges of the ramp 20. The resulting crowned profile is generally convex, with no drastic changes in profile or sharp edges being present which would unduly create localized contact stresses and stress risers in the metal layer 30 and the ramp 20 when in rolling contact with the roller bearings 16.

In order to achieve the uniform crowned profile described above without relying on a pre- or post-plating grinding operation, the present invention utilizes a unique electroplating process. The electroplating process involves selectively shaping the electrostatic field generated during the electroplating process, so as to concentrate the electrostatic flux at the intermediate region 52 of the ramp profile 28. As a result, a greater amount of plating metal is deposited in the intermediate region 52 as compared to the edge regions 50 of the ramp 20.

Figure 4:
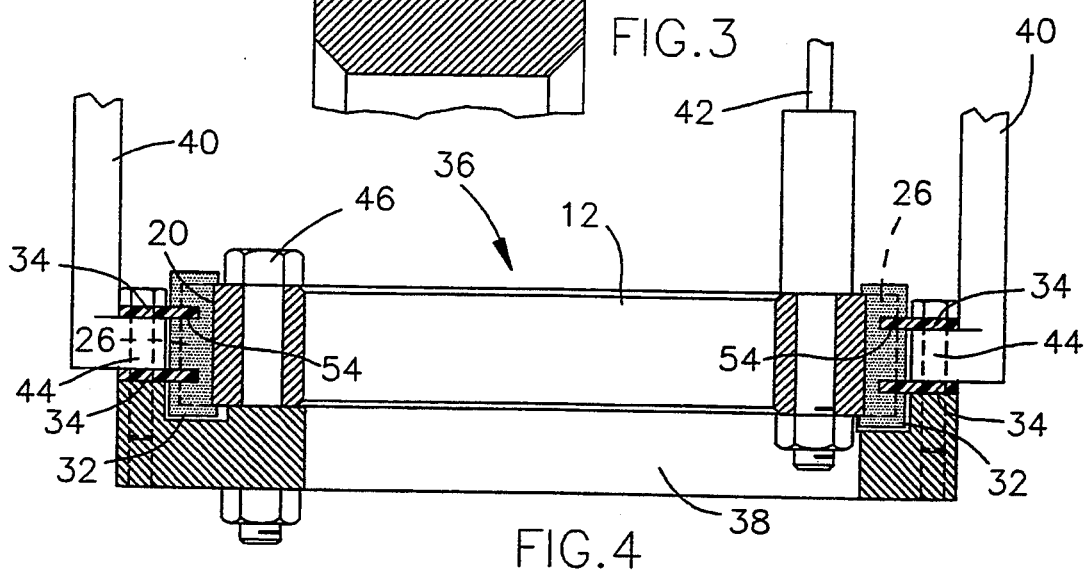
FIG. 4 shows in cross-section a preferred manner in which the camplate is fixtured for undergoing an electroplating process in accordance with this invention.

The preferred electroplating process of this invention includes positioning the camplate 12 within the mask 34 such that the mask 34 closely circumscribes the perimeter of the camplate 12, as defined by the ramp profiles 28 and the teeth 26, as shown in FIGS. 2 and 4. The caps 32 are also shown in position over the teeth 26, as described above. FIG. 4 illustrates the preferred axial position of the mask 34 relative to the camplate 12, wherein the mask 34 is centrally positioned adjacent the ramp profiles 28, such that about 50 to about 70 percent of the axial width of the ramp profile 28 is directly aligned with an annular-shaped opening 54 defined by the gap between the two members of the mask 34. As a result, the mask 34 substantially masks the edge regions 50 of each of the ramp profiles 28. This position is maintained by securing the mask 34 and the camplate 12 to a suitable plating fixture 36. As shown, the plating fixture 36 includes a support 38 to which the camplate 12 and the mask 34 are secured with one or more bolts 46 and 48, respectively.

The electrostatic field required for the electroplating process is generated in a conventional manner, with one or more anodes 40 being electrically connected to a cathode 42 through an aqueous solution of a salt containing ions of the metal to be deposited, such as chromium ions. The salt solution is contained in an electrolytic cell (not shown) in which the electroplating process is carried out. As is also conventional, the cathode 42 also includes the camplate 12 being plated, as is indicated by the cathode 42 being physically attached to the camplate 12 as shown in FIG. 4. The terminal ends 44 of the anodes are positioned adjacent and preferably within the annular-shaped opening 54 defined by the mask 34, as shown in FIG. 4. In this position, the mask 34 serves to shape the electrostatic field generated between the anode 40 and the camplate 12 during the electroplating process, such that the electrostatic flux of the field is concentrated within the intermediate region 52 of the ramp profile 28. The orientation of the plating fixture 36 shown in FIG. 4 is preferred in that it enables fresh plating solution to flow between the anode 40 and the camplate 12 during plating.

The electroplating process is then conducted, with the electric current and duration of the process being selected to deposit the desired thickness of metal on the ramp profiles 28, so as to generate the desired ramps 20. Due to the shaping of the electrostatic field and the resulting concentration of the electrostatic flux at the intermediate region 52 of the ramp profile 28, a greater thickness of metal is deposited on the intermediate region 52 than on the edge regions 50. It has been found that the electrostatic field can be readily shaped with the mask 34 to create the desired convex crown profiles of the ramps 20. In particular, the intermediate regions 52 of the ramps 20 receive the maximum thickness of the metal layer 30 for the purpose of concentrating the bearing load at the center of the ramps 20, while the metal layer 30 deposited at the edge regions 50 is smoothly and gradually tapered, with practically no metal being deposited at the very edges of the ramp 20. Thus, the desired crowned profile attainable in accordance with this invention serves to advantageously distribute the contact stresses imposed on each of the ramps 20 by the roller bearings 16.

In practice, two electroplating cycles have been found by which chromium metal can be deposited to a suitable thickness of about 0.005 to about 0.009 millimeters within the intermediate regions 52. The camplates 12 used in the evaluation of the electroplating process had an outer diameter of roughly about 19 centimeters, with eighteen ramp profiles 28 being spaced equidistantly along the perimeter of the camplate 12. Each ramp profile 28 had an axial width of about 32 millimeters and a circumferential width of about 11 millimeters. As those skilled in the art will recognize, the size and geometry of a camplate 12 electroplated in accordance with this invention is not critical, and the electroplating process and mask 34 can be readily adapted for camplates 12 having configurations which are considerably different from that shown in the Figures and described above.

The mask 34 was then positioned so as to be spaced about 3 to about 6 millimeters from the surface of the ramp profiles 28. In accordance with a first technique, an electric current of about 80 amps was sustained between the anodes 40 and the cathode 42 for about one minute in order to reverse etch the ramp profiles 28. The electric current was then lowered to about 45 amps, and maintained for an additional duration of about 14 to about 16 minutes in order to deposit the metal layer 30 on the ramp profiles 28. The second technique found to be suitable was conducted without the reverse etch step, using an electric current of about 40 to about 45 amps maintained for a duration of about 10 to about 14 minutes. After each electroplating process, the camplate 12 was conventionally baked at a temperature of between about 127° C. to about 143° C. for at least about 5 hours.

The results of the above electroplating techniques are indicated in the table below.

TABLE I

| CURRENT CYCLE (amps-minutes) | CHROMIUM PLATING THICKNESS (mm) | |
|---|---|---|
| | INTERMEDIATE REGION | ⅛ INCH FROM EDGE |
| 45 A - 16 min.* | 5.6–7.9 | 1.0–3.8 |
| 45 A - 14 min.* | 4.6–5.8 | 0.5–2.0 |
| 40 A - 10 min. | 5.3–6.4 | 1.0–2.3 |
| 45 A - 14 min. | 5.1–6.6 | 1.3–3.3 |

*Preceded by an 80 amp - 1 minute reverse etch.

The resulting crowned profiles formed on each of the ramp profiles 28 were generally convex, with no drastic changes in profile or sharp edges being present that would unduly create localized contact stresses and stress risers in the metal layer 30 or the ramp 20 when in rolling contact with the roller bearings 16. Furthermore, little metal was deposited at the very edges of the ramps 20.

Field testing of the above camplates 12 has determined that the thickness of the metal layer 30 within the intermediate regions 52 was sufficient to significantly improve the wear characteristics of the clutches 10 in which the camplates 12 were used. Importantly, the absence of a buildup of plated metal along the edge regions 50 of the ramps 20 eliminated the occurrence of cracking, chipping and excessive wear that would typically occur in the edge regions of a conventionally plated surface. As a result, it is believed an approximately 20 to 40 percent increase in service life can be achieved for camplates electroplated in accordance with this invention.

As a minimum, the second technique appears to indicate that an electric current of at least about 40 amps maintained for a duration of at least about 10 minutes is sufficient to successfully carry out the electroplating process of this invention, though it is foreseeable that those skilled in the art could readily alter the current levels and durations noted above and yet still attain desirable plating results.

From the above, it can be seen that the wear characteristics of camplates 12 plated in accordance with the electroplating process of this invention were significantly enhanced over that known in the prior art. The ability to create a crown profiled ramp 20 using the preferred electroplating process is a significant advantage over the grinding operations which are known and practiced in the bearing and gear industries from the standpoint of cost efficiencies.

Accordingly, an advantageous feature of the electroplating process of this invention is that the resulting crowned profiled ramps 20 are able to advantageously distribute the contact stresses imposed on the ramps 20 by roller bearings 16 in rolling contact with the ramps 20. Significantly, the higher contact stresses between the ramps 20 and the roller bearings 16 are concentrated in the intermediate region 52 of the ramp 20, such that the tendency for the edges of the ramps 20 to deform under normal loading conditions is significantly reduced. Excessively high contact stresses at the edges of the ramps 20 are substantially avoided even when misalignment exists between one of the roller bearings 16 and its ramp 20, such as when the rolling axis of roller bearing 16 is not parallel with the axis of the camplate 12. Consequently, greater wear will not generally occur at the edges of the camplate ramps 20.

In addition, the tendency for conventional electroplating processes to create a metal buildup at the extreme edges of the surfaces being plated is substantially eliminated by the process of this invention, such that cracking and chipping of the metal plating in these regions is practically eliminated. In particular, by shaping the electrostatic field so as to concentrate the electrostatic flux in the intermediate region 52, the greatest thickness of the metal plating 30 occurs in the intermediate region, with little metal being deposited at the extreme edges of the ramps 20.

Finally, the electroplating process taught by this invention is significantly more economical than pre- and post-grinding operations known in the bearing, cam, and gear industries. It is believed that the degree to which the service life of overrunning clutches 10 for locomotive turbochargers can be improved by electroplating their camplates 12 in accordance with the above can compensate for the additional processing costs incurred by the process. Where electroplating is already in use to produce a more wear resistant load bearing surface, the plating process of this invention can be adopted with minimal additional manufacturing costs, considering the modest cost of the mask 34 of this invention.

It should also be noted that although the advantages associated with the electroplating method of this invention have been described in terms of crown plating the ramps 20 of a clutch camplate 12 for use in the turbocharger of a locomotive diesel engine, the teachings of this invention are readily applicable to other plating techniques and applications where the wear characteristics of the plated surfaces and contact stresses generated in those surfaces are of concern. For example, overrunning clutches employed in the automotive industry for starter motors and transmissions and in the aerospace industry for helicopter drives will also benefit from the advantageous electroplating process of this invention. In addition, the plated crowned profile made possible with this electroplating process would be desirable on such mechanical components as bearing races, sprockets, pin journals, cogs, pawl rachet detent surfaces, and gears and cam surfaces.

Therefore, while our invention has been described in terms of a preferred embodiment, it is apparent that other forms could be adopted by one skilled in the art. For example, processing parameters such as the current levels and durations employed could be modified, or appropriate materials could be substituted for those stated for the bearings, camplate and metal plating, or the electroplating process could be utilized to produce wear resistant surfaces for an alternative application or environment. Accordingly, the scope of our invention is to be limited only by the following claims.

The embodiments of the invention in which an exclusive property or privilege is claimed are defined as follows:

1. A method for electroplating a camplate of an overrunning clutch, the method comprising the steps of:
   circumscribing a load bearing surface formed on a surface of the camplate with a mask, such that said mask substantially masks edge regions of said load bearing surface and such that said mask defines an opening which is aligned with an intermediate region of said load bearing surface, said intermediate region being that portion of said load bearing surface which is intermediate said edge regions, said intermediate region and said edge regions defining a width of said load bearing surface;
   positioning an electrode adjacent said opening in said mask so as to shape an electrostatic field generated by said electrode and thereby concentrate electrostatic flux at said intermediate region of said load bearing surface; and
   electroplating the camplate such that a greater thickness of metal is deposited on said intermediate region of said load bearing surface than said edge regions of said load bearing surface, so as to more uniformly distribute a bearing load imposed on said load bearing surface by a roller bearing disposed widthwise across said load bearing surface.

2. A method as recited in claim 1 wherein the metal deposited during said electroplating step is chromium.

3. A method as recited in claim 1 wherein said electroplating step includes depositing a layer of metal which is about 0.005 to about 0.009 millimeters thick at said intermediate region of said load bearing surface.

4. A method as recited in claim 1 wherein said positioning step includes placing said electrode within said opening in said mask so as to concentrate electrostatic flux at said intermediate region of said load bearing surface.

5. A method as recited in claim 1 wherein said circumscribing step includes spacing said mask about 3 to about 6 millimeters from said load bearing surface.

6. A method as recited in claim 1 wherein said circumscribing step includes defining said opening in said mask to have a width which is about 50 to about 70 percent of said width of said load bearing surface.

7. A method as recited in claim 1 wherein said electroplating step includes sustaining a current between said electrode and said camplate of at least about 40 amps for a duration of at least about 10 minutes.

8. A method for electroplating an annular-shaped camplate of an overrunning clutch for a turbocharger of a locomotive diesel engine, wherein the camplate has a plurality of ramps defined at an outer perimeter of the camplate, each of said plurality of ramps having an intermediate region which is intermediate a pair of edge regions and constitutes about 50 to about 70 percent of each of said plurality of ramps, said intermediate region and said edge regions defining a width of each of said plurality of ramps, the method comprising the steps of:
   circumscribing said plurality of ramps of the camplate with a mask such that said mask substantially masks said edge regions of each of said plurality of ramps and such that said mask defines an annular-shaped opening which is aligned with said intermediate region of each of said plurality of ramps;
   positioning an electrode adjacent said opening in said mask so as to shape an electrostatic field generated by the electrode and thereby concentrate electrostatic flux at said intermediate region of each of said plurality of ramps; and
   electroplating said plurality of ramps of the camplate such that a greater thickness of metal is deposited on the intermediate region of said plurality of ramps than said edge regions of said plurality of ramps so as to more uniformly distribute a bearing load imposed on each of said plurality of ramps by roller bearings disposed widthwise across each of said plurality of ramps.

9. A method as recited in claim 8 wherein said metal deposited during said electroplating step is chromium.

10. A method as recited in claim 8 wherein said electroplating step includes depositing a layer of metal which is about 0.005 to about 0.009 millimeters thick at said intermediate region.

11. A method as recited in claim 8 wherein said positioning step includes placing said electrode within said opening in said mask so as to concentrate electrostatic flux at said intermediate region of said ramp.

12. A method as recited in claim 8 wherein said circumscribing step includes spacing said mask about 3 to about 6 millimeters from each of said plurality of ramps.

13. A method as recited in claim 8 wherein said circumscribing step includes defining said opening in said mask to have a width which is about 50 to about 70 percent of the width of each of said plurality of ramps.

14. A method as recited in claim 8 wherein said electroplating step includes sustaining a current between said electrode and said camplate of at least about 40 amps for a duration of at least about 10 minutes.

15. A camplate for an overrunning clutch, the camplate having a plurality of ramps defined at a perimeter of the camplate, each of said plurality of ramps having an intermediate region which is intermediate a pair of edge regions and which constitutes about 50 to about 70 percent of each of said plurality of ramps, said intermediate region and said edge regions defining a width of each of said plurality of ramps, wherein said plurality of ramps are electroplated by a method comprising the steps of:

circumscribing the perimeter of the camplate with a mask such that the mask substantially masks said edge regions of each of said plurality of ramps and such that said mask defines an annular-shaped opening which is aligned with said intermediate region of each of said plurality of ramps;

positioning an electrode adjacent said opening in said mask so as to shape an electrostatic field generated by said electrode and thereby concentrate electrostatic flux at said intermediate regions of each of said plurality of ramps; and electroplating said plurality of ramps such that a greater thickness of metal is deposited on said intermediate regions of said plurality of ramps than on said edge regions of said plurality of ramps, so as to more uniformly distribute a bearing load imposed on each of said plurality of ramps by roller bearings disposed widthwise across each of said plurality of ramps.

16. The camplate as recited in claim 15 wherein the metal is chromium.

17. The camplate as recited in claim 15 wherein said metal deposited on said intermediate regions of each of said plurality of ramps is about 0.005 to about 0.009 millimeters thick.

18. The camplate as recited in claim 15 wherein said positioning step includes placing said electrode within said opening in said mask so as to concentrate electrostatic flux at said intermediate region of said ramp.

19. The camplate as recited in claim 15 wherein said circumscribing step includes spacing said mask about 3 to about 6 millimeters from each of said plurality of ramps.

20. The camplate as recited in claim 15 wherein said circumscribing step includes defining said opening in said mask to have a width which is about 50 to about 70 percent of the width of each of said plurality of ramps.

* * * * *